United States Patent
Lutz et al.

(10) Patent No.: US 6,169,978 B1
(45) Date of Patent: Jan. 2, 2001

(54) MAIL HANDLING PROCESS AND DEVICE

(75) Inventors: Bernhard Lutz, Delbrück; Udo Tewes; Uwe Urban, both of Paderborn; Holger Kremer, Lippspringe, all of (DE); Hans Walter Flückiger, Ötwil am See; Stefan Sieber, Schlieren, both of (CH)

(73) Assignee: Siemens Aktiengesellschaft, Munich (DE)

( * ) Notice: Under 35 U.S.C. 154(b), the term of this patent shall be extended for 0 days.

(21) Appl. No.: 09/043,940

(22) PCT Filed: Aug. 21, 1996

(86) PCT No.: PCT/DE96/01552

§ 371 Date: Mar. 27, 1998

§ 102(e) Date: Mar. 27, 1998

(87) PCT Pub. No.: WO97/13223

PCT Pub. Date: Apr. 10, 1997

(30) Foreign Application Priority Data

Sep. 29, 1995 (DE) .............................................. 195 36 482
Dec. 4, 1995 (DE) .............................................. 195 45 158

(51) Int. Cl.$^7$ .................................................. G07B 17/00
(52) U.S. Cl. .......................... 705/406; 702/155; 702/158; 702/159; 705/401
(58) Field of Search ........................ 177/25.15; 702/155, 702/156, 158, 159, 166; 705/401, 406, 407, 410

(56) References Cited

U.S. PATENT DOCUMENTS

| | | | |
|---|---|---|---|
| 2,688,878 | * | 9/1954 | Kolisch .................................. 73/865 |
| 2,689,082 | * | 9/1954 | Kolisch ................................ 705/414 |
| 2,708,368 | * | 5/1955 | Kolisch .................................. 73/865 |
| 2,727,391 | * | 12/1955 | Kolisch .................................. 73/865 |
| 2,812,904 | * | 11/1957 | Kolisch ................................ 705/414 |
| 3,290,491 | * | 12/1966 | Wahlberg ............................. 705/406 |
| 3,436,968 | * | 4/1969 | Unger et al. ............................ 73/433 |
| 3,513,444 | * | 5/1970 | Henderson et al. .................. 356/379 |
| 4,516,264 | * | 5/1985 | Covari et al. ......................... 382/101 |
| 4,773,029 | * | 9/1988 | Claesson et al. ..................... 702/167 |
| 4,868,757 | * | 9/1989 | Gil ........................................ 705/406 |
| 5,313,404 | * | 5/1994 | Wu ........................................ 700/227 |
| 5,331,118 | * | 7/1994 | Jensen ............................... 177/25.14 |
| 5,369,258 | * | 11/1994 | Sansone et al. ...................... 235/381 |
| 5,460,273 | * | 10/1995 | Stevens et al. ....................... 209/584 |
| 5,498,114 | * | 3/1996 | Gregorie et al. ........................ 414/21 |
| 5,528,517 | * | 6/1996 | Loken .................................. 702/156 |
| 5,651,445 | * | 7/1997 | Stevens et al. ....................... 198/447 |
| 5,656,799 | * | 8/1997 | Ramsden et al. ......................... 177/2 |
| 5,712,787 | * | 1/1998 | Yeung ................................... 705/10 |
| 5,719,678 | * | 2/1998 | Reynolds et al. .................... 356/379 |
| 5,770,841 | * | 6/1998 | Moed et al. .......................... 235/375 |
| 5,793,652 | * | 8/1998 | DeBarber et al. ................... 702/173 |
| 5,808,912 | * | 9/1998 | Dlugos et al. ........................ 702/166 |
| 5,822,739 | * | 10/1998 | Kara ..................................... 705/410 |
| 5,831,202 | * | 11/1998 | Ramseden et al. ...................... 177/1 |
| 5,878,379 | * | 3/1999 | Dlugos et al. ........................ 702/156 |
| 5,914,464 | * | 6/1999 | Vogel .................................... 177/145 |
| 6,006,210 | * | 12/1999 | Freeman et al. ..................... 705/402 |

FOREIGN PATENT DOCUMENTS

| | | |
|---|---|---|
| 3109270 A1 | 9/1982 | (DE) . |
| 3804079 A1 | 9/1988 | (DE) . |
| 0031973 * | 7/1981 | (EP) . |
| 0 264 502 * | 4/1988 | (EP) . |
| 0643374 * | 3/1995 | (EP) . |
| 0647479 * | 4/1995 | (EP) . |
| 871145 A2 * | 10 1998 | (EP) . |

OTHER PUBLICATIONS

Wurz: "Bad coding basics"; Plant Engineering, v49, n6, May 8, 1995, p. 94.

* cited by examiner

*Primary Examiner*—Edward R. Cosimano
(74) *Attorney, Agent, or Firm*—Hill & Simpson

(57) ABSTRACT

A process and device for automaticaly posting virtually and item of mail wherein the item of mail is deposited on a handling surface and images of the item of are processed by an electronic camera.

48 Claims, 3 Drawing Sheets

MAIL HANDLING PROCESS AND DEVICE

BACKGROUND OF THE INVENTION

1. Field of the Invention

The present invention relates to a unit with which items of mail or the like can be automatically accepted.

More specifically, the present invention relates to units which are capable of simultaneously determining the postal fee for the item of mail and providing the item of mail with the markings to be applied in the case of manual acceptance.

2. Description of the Prior Art

In EP-A-0 264 502 there is described a unit which accepts, weighs and franks letters, and also charges postage. However wherein this unit is only capable of accepting and handling flat letters which fit through a slot.

EP-A-0 643 374 discloses an electronic franking system for items of mail having a housing and an acceptance compartment for items of mail to be handled wherein the acceptance compartment is arranged in the housing and can be closed by a closure plate. The system also has a control means, a handling plate for the items of mail, at least one measuring means for physical properties of the items of mail wherein an amount for prepayment is calculated from the weight and the dimensions in the control means, and a printing means connected to the control means for applying a prepayment to the item of mail.

The measuring means includes both a balance and a number of light barriers for the maximum permissible length and width of the item of mail. For measuring the length and width, the item of mail is aligned with respect to two edges of the handling plate which are perpendicular to each other and the dimensions are determined from the coincidence of individual light barriers. The alignment also brings the item of mail into a geometrical relationship which determines the place where the prepayment is applied.

EP-A-0 647 749 discloses a parcel sorting system which scans the surface of parcels transported on a conveyor belt by a video camera and measures the height of the parcels by an ultrasonic sensor. The address area is captured by a plurality of additional cameras.

The charges for items sent by mail depend not only on weight but also on their dimensions. Consequently, in a system for the automatic acceptance of items of mail, it must also be possible for their dimensions to be satisfactorily ascertained. In the case of items of mail which are not entirely flat, such as for example relatively thick letters and parcels, under certain circumstances this presents considerable difficulties since, in the attempt to measure the maximum geometrical extent of a relatively large item by means of a camera, there is a measuring uncertainty caused by parallax.

SUMMARY OF THE INVENTION

An object of the present is to specify a unit, and an operating process for such a unit, with which virtually all items of mail allowed to be posted can be accepted, measured and handled.

The present achieves this object by the customer who is posting the item of mail and depositing it on a handling surface. A line of light barriers measures the thickness of the item of mail and images of the item of mail are created by an electronic camera. With the aid of the images, both the length and width of the item of mail can be ascertained. In addition the position of a marking, in particular of a postage stamp or adhesive label, can be determined and verified and a record of posting can be created without the item necessarily having to be handed over in a particular position.

An exact measurement of the length and width of the item of mail is made possible by a Fresnel lens being arranged between the handling surface and the camera in such way that its focal point lies at the focal point of the camera optics; the dimensions of the Fresnel lens being greater than the vertical projection of the largest item of mail to be measured onto the handling surface.

Even relatively large Fresnel lenses can be produced inexpensively. They take up only little space in the direction of the optical axis, with the result that low-cost space-saving measuring systems with which even relatively large items can be accurately measured can be set up.

The handling surface is preferably light-diffusing surface, with the result that the item of mail to be measured lies on a diffusely illuminated surface. The handling surface may in this case be a translucent diffuser, that is to say a ground-glass screen; the light source preferably being arranged beneath the handling surface and the camera preferably being arranged above it. In the case of a translucent handling surface, the light source, which may also comprise a plurality of lamps, is preferably arranged laterally above the handling surface.

The imaging of the item of mail, or its outline, onto the CCD element of the electronic camera then makes it possible for the exact dimensions of the items of mail to be ascertained. In addition to a space-saving, technically simple and inexpensive solution for measuring the contour of items of mail, the solution according to the present invention also has a further advantage: if the Fresnel lens is arranged in such a way that it can be operationally moved out of the path of rays of the camera, a photo of the surface of the item of mail can also be taken by the same camera, or another camera alongside, in order, for example, to create a receipt for the acceptance and handling of the item of mail or to evaluate address codes and the like. All that is needed for this purpose, if required, is to provide an additional light source to illuminate the item of mail from above.

According to an alternative embodiment of the present invention, it is proposed to design the device mentioned at the beginning in such a way that a Fresnel lens is arranged between the light source and the item of mail and a translucent diffuser is arranged between the item of mail and the camera. In this case, either the side facing the camera of the Fresnel lens itself can be used as the bearing surface, or the bearing surface is a transparent plate arranged between the Fresnel lens and the diffuser.

Further advantageous refinements and variants of the present invention are represented in the following description and drawing of exemplary embodiments as well as in the patent claims.

DETAILED DESCRIPTION OF THE PREFERRED EMBODIMENTS

Figure 1:
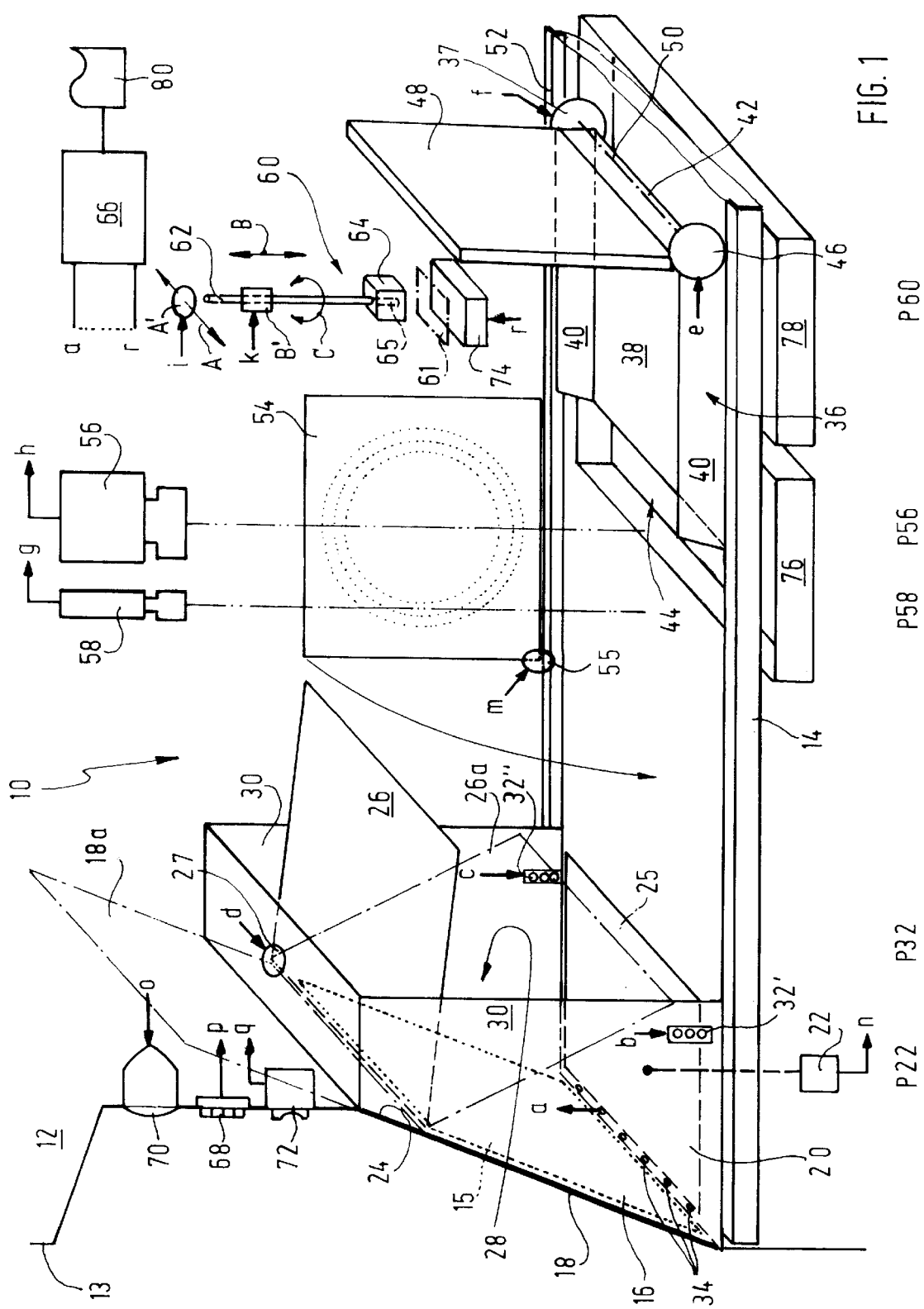
FIG. 1 shows a diagrammatic representation of a mail handling facility in a preferred embodiment.

In FIG. 1, a device 10 for the automatic handling of items of mail is diagrammatically represented in a perspective side view. The device 10 is installed in a housing 12, of which only the contour of the front wall 13 is shown for the sake of better overall clarity. The subassemblies described below are built up on a frame 14, which is displaceably mounted in the housing 12 together with the front wall 13 on telescopic rails (not shown).

Arranged behind an opening 15 in the front wall 13 is an acceptance compartment 16 which is closed by a sliding door 18. To make the acceptance compartment 16 accessible for a customer, the sliding door 18 can be pushed upward into the position 18*a* represented by dash-dotted lines. The acceptance compartment is bounded at the bottom by the weighing plate 20 of an electronic balance 22. Above the sliding door 18, there is articulated on the front wall 24 of the acceptance compartment 16 a closure flap 26 which is able to swivel between a position protruding horizontally into the interior of the device and a swung-down position 26*a*. The sliding door 18 and the closure flap 26 are driven by a first motor 27. They bound the acceptance compartment 16, wherein the sliding door 18 and the closure flap 26 are not open at the same time. This ensures that, during the acceptance operation, the other parts of the device are not accessible from outside.

An item of mail 112 to be posted (FIG. 6) is deposited by a customer posting the item onto a handling plate 38, which is located in the acceptance compartment 16 for this purpose, with the sliding door 18*a* open and the closure flap 26*a* swung down. In the embodiment represented, the handling plate 38 forms the base of a drawer 36 which can be pushed through a slot 25 beneath the swung-down closure flap 26*a* into the acceptance compartment 16 and over the weighing plate 20.

Secured above the weighing plate 20 and in the vicinity of a rear opening 28 in the acceptance compartment 16 there is, on the side walls 30 of the latter, a vertical row of light barriers 32 having a line of transmitters 32' and a line of receivers 32". Directly behind the sliding door 18 there is installed in the frame 14 a series of reflected light barriers 34, the scanning direction of which points vertically upward. The reflected light barriers 34 are distributed at close intervals over the entire width of the acceptance compartment 16.

The drawer 36 can be moved on the frame 14 with the aid of a second motor 37 between a position P22 retracted into the acceptance compartment 16 and various positions P58, P56, P60 lying outside the acceptance compartment 16. The drawer 36 has an opaque base 38, transparent side walls 40 and a rear wall 42. On its front side 44 and at the top, the drawer 36 is open. In its position P22 retracted into the acceptance compartment 16, the drawer 36 can be lowered onto the weighing plate 20 by an adjusting drive (not shown). Fitted on the rear wall 42 of the drawer 36 is a swiveling drive 46 on which a turning plate 48 of opaque material is secured such that it can swivel. The swiveling drive 46 makes it possible for the drawer 36 and the turning plate 48 to be swiveled independently of each other above the frame 14 about a swivel axis 50, parallel to the rear wall 42 [in each case through 180°], and lowered downward.

On a side member 52 of the frame 14, a Fresnel lens 54 is articulated in such a way that it can be swiveled under motor power with the aid of a third motor 55 between a position covering the drawer 36 and a position swung out of the displacement path of the drawer. Arranged centrally above the Fresnel lens 54, swung down onto the drawer 36, is an area video camera 56, the angular aperture of which allows the entire surface of the Fresnel lens 54 to be covered. In addition to this camera, fitted centrally above the frame 14 is a high-resolution line video camera 58, the angular aperture of which corresponds to the width of the drawer 36. An application means 60 for markings, in particular adhesive labels 61 and stamps, can be moved by a fourth motor A' over the entire width of the drawer 36 in the direction of a double-headed arrow A. A fifth motor B' is able to lower the application means 60 in the direction of the double-headed arrow B onto the drawer 36 and raise it again. The application means 60 comprises a tube 62 which is connected to a vacuum pump (not shown), the lower end 65 of which is surrounded by a flexible pad 64 of a closed-cell foam plastic. The tube 62 can, furthermore, be rotated together with the pad 64 about the longitudinal axis of the tube by the fifth motor B', as the double-headed arrow C indicates.

The motors for the abovementioned sequences of movements are connected to a control means 66. The end positions of the sliding door 18, of the closure flap 26, of the swiveling drive 46 and of the Fresnel lens 54 are reported by limit switches (not shown) likewise connected to the control means 66, which controls the drive motors on the basis of these reports. The position of the drawer 36 on its displacement path and the coordinates of the manipulator drives are reported by sensors to the control means 66. Also connected to the latter are the data outputs of the balance 22 and of the cameras 56 and 58 as well as the light barriers 32 and 34. The connections are symbolically represented by connecting arrows a to r. Moreover, a printer 80 may be connected to the control means 66 for outputting a record of a charge.

In the ready position of the device 10, the sliding door has been moved into the position 18*a* and the closure flap has been moved into the position 26*a*. The drawer 36 is in the acceptance compartment 16. Said elements are locked in this position; for example, by a self-locking action typical of motors.

Figure 2:
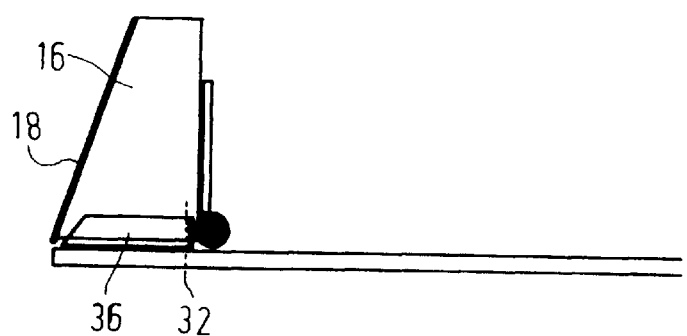
FIGS. 2–5 show the facility from FIG. 1 in various stages of operation.
Figure 3:
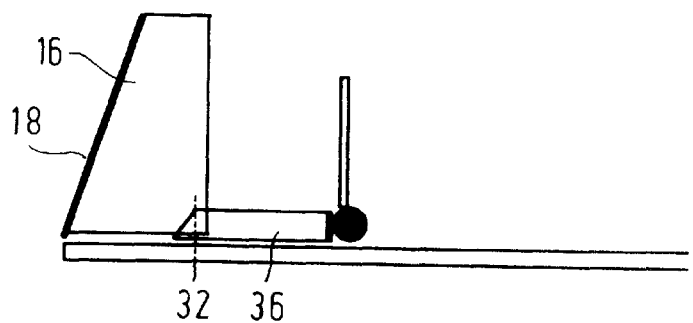

FIGS. 2 to 5 show the device 10 in various working positions. In FIG. 2, the situation immediately after depositing an item of mail in the drawer 36 is represented. The sliding door 18 is closed and the drawer 36 has been lowered onto the weighing plate 20. In this position, the balance 22 can ascertain the weight of the deposited item of mail and report it to the control system. After the weighing operation, the drawer 36 is raised again and moved out of the acceptance compartment 16 to the rear. After covering a predetermined distance—4 cm in the exemplary embodiment—the reflected light barriers 34 must not receive light reflected from the item of mail any longer. Should this not be the case, the control means 66 interprets this as an indication that the item of mail 112 has become jammed by the sliding door 18. In this case, the drawer 36 is moved back into its rest position and the sliding door 18 is opened. If, on the other hand, all the reflected light barriers 34 are free, the drawer 36 continues its journey. In this case, the entire area of the drawer is swept by the line of light barriers 32 through the transparent side walls 40. Depending on the height of the item of mail, some of the light barrier receivers 32" are darkened. The number of darkened light barrier receivers 32" is a measure of the height of the item of mail and is likewise reported to the control means 66. FIG. 3 shows the situation after ending the thickness measurement.

Figure 4:
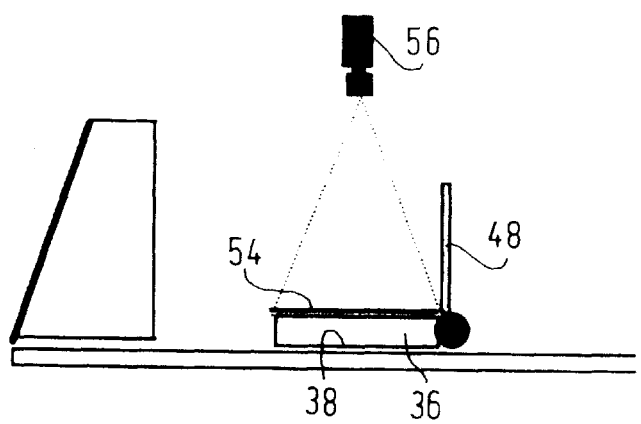

In FIG. 4, the drawer 36 has reached the coverage zone of the area camera 56 and has been stopped Thereat. The Fresnel lens 54 has been swiveled onto the drawer 36. The opaque base 38 of the drawer 36 is diffusely transilluminated from below. The area camera 56 registers the outlines of the item of mail, which is possible without any parallax thanks to the parallelization of the rays of light through the Fresnel lens 54. The video signal of the area camera 56 is transmitted to the control means 66 and stored therein. As the Fresnel lens 54 is then swiveled away from over the item of mail 112. the high-resolution camera 58 sends to the control means 66 the video signals of an exact copy of the item of mail 112, in which there is contained not only the outlines of this item of mail but also the entire surface with the address area.

The customer is then requested to enter on a keypad 68 the desired type of dispatch, for example "regular letter", "express delivery", or "registered mail". The control means 66 then calculates, on the basis of this information and the weight, thickness, length and width of the item of mail, the postage to be paid and then indicates this to the customer. At the same time, the item of mail 112 is displayed on a screen 70 in a standardized position, i.e. with edges parallel to the edges of the screen. In the top right-hand corner of the item of mail there is symbolically depicted a prepayment in the form of a label. If the customer agrees to the arrangement of this label, he pays the postage indicated at a paying-in machine 72 and actuates a terminating key. Alternatively, a machine-readable and possibly electronically-cancelable stamp may also be used. If, on the other hand, the customer does not accept the place where the prepayment is to be applied, for example because the label would cover the address area, he can, by pressing a key, turn the image of the item of mail on the screen 70 through 90° in each case, until he has found a place for attaching the label acceptable to him. By means of control keys, the customer can be given the possibility of modifying the proposed position.

Figure 5:
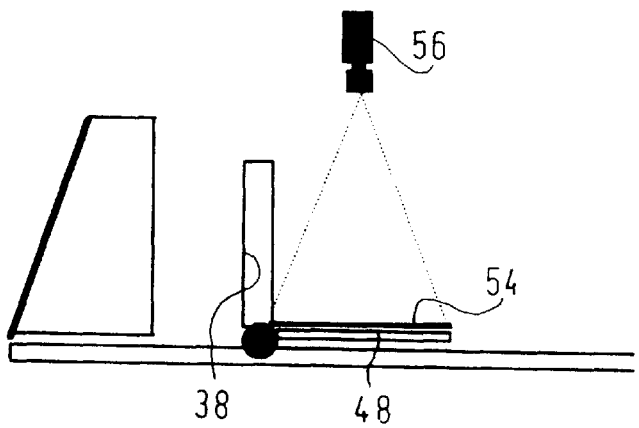

It can also be seen on the screen 70 if the item of mail 112 has been placed in the drawer 36 with the address area facing down. The customer then has the possibility, by actuating a "turn item" key, of turning the item of mail 112 over. This takes place in the following way: the turning plate 48 is swiveled out of its upright position, represented in FIG. 1, onto the drawer 36. Subsequently, the entire arrangement is swiveled to the right through 180°, with the result that the item of mail 112 comes to lie on the turning plate 48. Thereafter, the drawer 36 is swiveled back through 90°. Then, the entire arrangement including drawer 36 and turning plate 48 is moved to the left by the width of the turning plate 48, with the result that the item of mail 112 comes to lie again under the area camera 56 and the high-resolution camera 58. This situation is represented in FIG. 5. With the Fresnel lens 54 swiveled down once again, the cameras 56, 58 then ascertain one after the other the position of the item of mail 112 on the turning plate 48 and, with the Fresnel lens 54 swiveled away, the exact image of the item of mail. The post-office customer then once again has the possibility of determining the place where the label 61 is to be applied to the item of mail 112.

As an alternative to the described use of the turning plate 48 as a handling plate, after the drawer 36 has been swiveled back, the turning plate 48 may also be swiveled again, with the result that the item of mail in the turned-over position slides into drawer 36 and for further handling.

After payment of the postage and acceptance of the labeling place on the item of mail 112, a correspondingly printed label 61 is prepared by a label printer 74, connected to the control means 66, and fetched by the application means 60. This takes place by the pad 64 being brought over the label 61 and lowered onto it. The reduced pressure generated in the tube 62 has the effect that the label is sucked onto the pad 64, where it is held in place. The control means 66 then calculates from both the actual position of the item of mail and the customer's placement request the actual place where the label 61 is to be applied and then steers the application means 60 over the desired place of application and prints the label onto the item of mail 112. The fact that the pad is flexible means that the label 61 can also be applied to uneven surfaces.

If the item of mail was, for example, a registered item, a very accurate electronic image of the front and rear sides of this item of mail is recorded by the high-resolution camera 58 and stored in a search computer, where it can be called and printed out if, for instance, a search is to be made for a lost item of registered mail. It is also possible to print off an image of the item of mail 112 on a record of posting which is then handed to the customer as a receipt.

After final clearance of an item of mail, the drawer 36 is swiveled down, with the result that the item of mail 112 can slide into a collecting container 76 arranged beneath the frame 14. It is also possible to arrange a plurality of collecting containers 76, 78, for example for regular mail or for registered and express mail, beneath the frame 14. The drawer 36 must then be moved over the corresponding container before the item of mail 112 is tipped off. A container 78 lying at the rear is reached by the item of mail 112 being tipped off from the turning plate 48.

Figure 6:
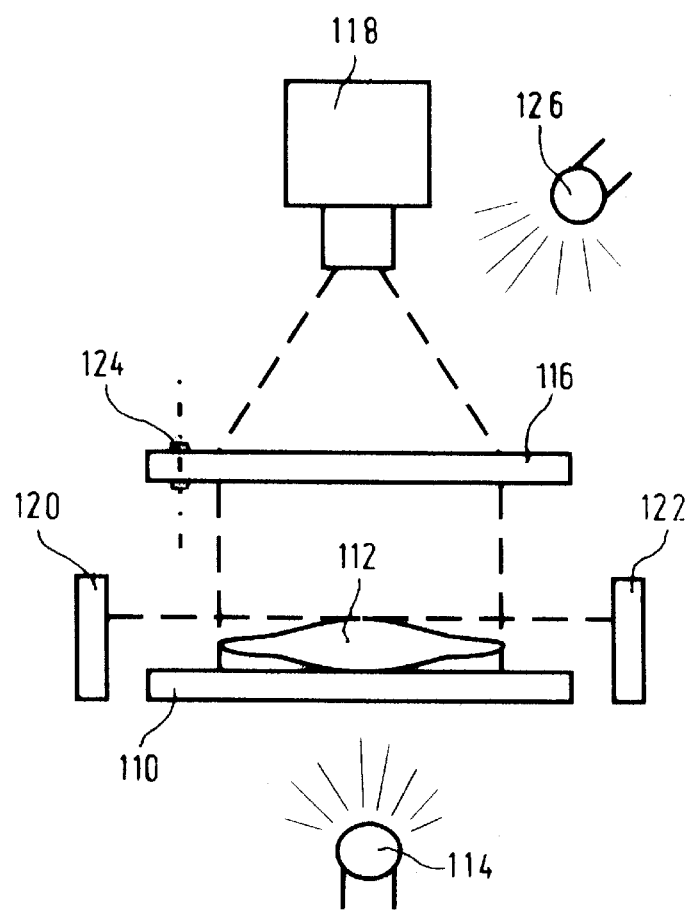
FIG. 6 shows a diagrammatic representation of a measuring device according to the present invention for measuring the dimensions of mail.

In FIG. 6, there can be seen a ground glass plate 110 which forms a translucent diffuser and on which the item of mail 112 to be measured rests. Beneath the ground glass plate 110 there is a light source 114. Arranged above the ground glass plate 110 at a distance which corresponds to the thickest item of mail to be processed is a Fresnel lens 116, the area dimensions of which are greater than the extent of the largest item of mail to be processed. Arranged above the Fresnel lens 116 is an electronic camera 118. The camera 118 and the Fresnel lens 116 are arranged in relation to each other in such a way that the focal point of the two coincides. Since only the image rays running parallel to the optical axis are captured by the camera 118 through the Fresnel lens 116, the outline of the item of mail 112, which stands out from the diffusely illuminated ground glass plate 110, is captured without parallax by the camera 118. The height or thickness of the item of mail 112 can, in turn, be sensed by a—line light barrier 120, 122.

For purposes of acknowledging receipt or for further handling of the item of mail 112, the upper side of the mail be photographed. For this purpose, the Fresnel lens 116 is arranged in such a way that it can be moved out of the path of rays of the camera 118. This may take place in the way indicated in FIG. 6 by the Fresnel lens 116 being mounted such that it can swivel about a vertical axis 124. Furthermore, in the case of the embodiment according to FIG. 6, a further light source 126 is arranged above the ground glass plate 110 to be able to illuminate the upper side of the item of mail 112 if it is to be photographed by the camera 118. For this photo, the light source 114 is switched off and the light source 126 is switched on. The adjustment of the Fresnel lens 116 and the switching over of the illumination do not require any great technical expenditure. Consequently, both the contour of the item of mail 112 can be measured without parallax and a copy of its surface can be created by means of just one camera.

Figure 7:
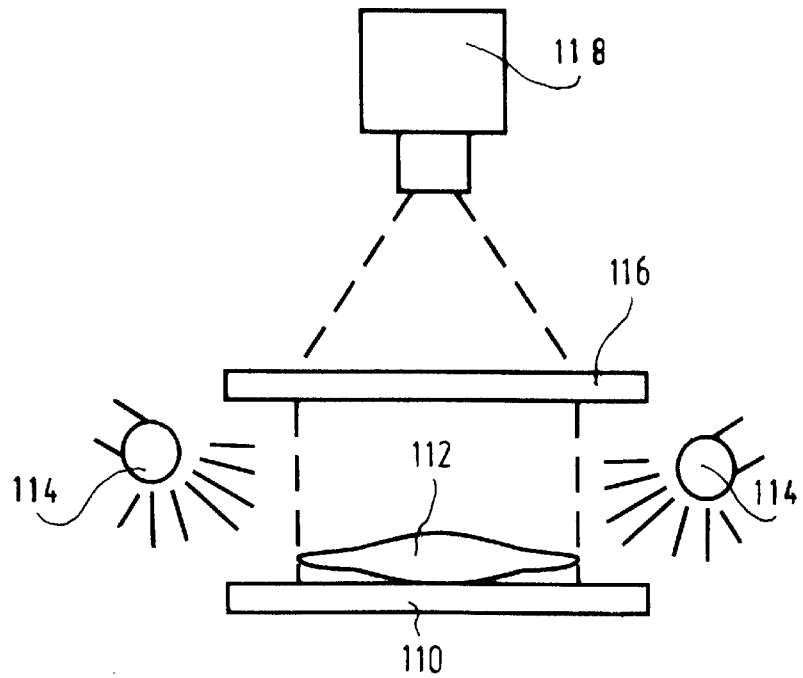
FIG. 7 shows a diagrammatic representation corresponding to FIG. 6 of an alternative embodiment of the measuring device.

FIG. 7 shows an embodiment which differs from that according to FIG. 6 only in the arrangement of the light source and possibly the design of the handling surface. The same parts are provided with the same reference numerals. In the case of the embodiment according to FIG. 7, the light source 114 is arranged above the handling surface 110, the latter in turn being designed as a light-diffusing surface. It may be a ground glass plate, as in the case of FIG. 6, or else an opaque, plate. The arrangement of the Fresnel lens 116 and of the camera 118 is as shown in FIG. 6. This solution has the advantage in that there is no switching over of the illumination when the Fresnel lens 116 is moved out of the path of rays of the camera 118 for photographing the surface of the item of mail 112.

Various modifications to the facility described are possible without going beyond the scope of the invention. Indeed, instead of sensing the thickness of the item of mail with the aid of a line of light barriers, it is possible to lower onto the item of mail from above a pressure plate aligned parallel with the base 38 of the drawer 36. The displacement path is then a measure of the thickness of the item of mail. This arrangement has the advantage in that convex items of mail can be pressed flat and creases can be bent down. This makes it possible for the thickness to be ascertained more exactly.

Instead of application means for labels, there may be fitted on the manipulator a printing head, preferably an ink-jet printing head, by means of which a franking mark can be printed directly onto the item of mail.

The image of the outline and the exact recording of the item of mail 112 can be created by means of a single camera i.e., the high-resolution line video camera 54 alone. The video signals of the high-resolution video image, which are sent to the control means 66, can be subjected to a text recognition process in the control means 66, with the aim of automatically sensing, for example, the ZIP code from the address. With this information, a letter sorting installation can be directly controlled, or else the ZIP code can be printed onto the item of mail 112 or onto the label 61 in a coding which can be read by downstream letter sorting installations, such that the item of mail 112 may be automatically diverted for continued conveyanceto, for example, a respective collecting container 76, 78. The ZIP code thus determined can be offered to the customer via the screen 70 for verification or correction via the kay pad 68.

What is claimed is:

1. A device for automatically accepting and marking an item of mail, comprising:
   an acceptance compartment for accepting the item of mail;
   a handling plate for handling the item of mail upon receipt from the acceptance compartment;
   a controller for moving the handling plate along a displacement path between the acceptance compartment and a plurality of mail handling positions;
   a measuring system for measuring physical properties of the item of mail and forwarding physical properties data to the controller;
   an electronic camera connected to the controller and positioned above the displacement path at a mail handling position;
   a display positioned near the acceptance compartment for displaying at least a surface image of the item of mail recorded by the electronic camera; and
   an applicator connected to the controller for applying a marking to the item of mail positioned on the controller.

2. A device as claimed in claim 1, further comprising:
   a balance upon which the handling plate may be placed for weighing the item of mail.

3. A device as claimed in claim 1, further comprising:
   an electro-optical measuring device positioned on at least one side of the displacement path for measuring a height of the item of mail.

4. A device as claimed in claim 1, further comprising:
   a drawer having the handling plate as its base and which has open front and top sides, the drawer being tiltable about an axis defined at an intersecting point between the handling plate and rear side of the drawer.

5. A device as claimed in claim 4, further comprising:
   a turning plate as part of the rear wall, the turning plate being tiltable from a substantially vertical to substantially horizontal position.

6. A device as claimed in claim 1, further comprising:
   a housing in which the acceptance compartment is located;
   a closure device on the housing which is controlled by the controller and which only allows the item of mail to be inserted into the acceptance compartment when in an open state; and
   a detector for reporting the closed state of the closure device to the controller.

7. A device as claimed in claim 6, further comprising:
   front and rear openings on the acceptance compartment;
   a front closure plate as part of the closure device, the front closure plate associated with the front opening of the acceptance compartment; and
   a rear closure plate as part of the closure device, the rear closure plate associated with the rear opening of the acceptance compartment, wherein only one or the other of the front and rear closure plates may be opened at a single point in time.

8. A device as claimed in claim 6, further comprising:
   a row of light barriers positioned behind the front closure plate, wherein the row of light barriers have an upwardly-pointing scanning direction and wherein the front closure plate is displaceable in a vertical direction.

9. A device as claimed in claim 1, further comprising:
   a light source positioned beneath the handling plate;
   a Fresnel lens positioned above the handling plate;
   a translucent diffuser positioned above the Fresnel lens; and
   an electro-optical measuring device positioned above the translucent diffuser for measuring both a length and width of the item of mail.

10. A device as claimed in claim 9, wherein the handling plate is positioned on a side of the Fresnel lens facing the electro-optical measuring device.

11. A device as claimed in claim 9, wherein the handling plate is transparent.

12. A device as claimed in claim 9, wherein the electro-optical measuring device is an electronic camera.

13. A device for automatically accepting and marking an item of mail, comprising:
   an acceptance compartment for accepting the item of mail;
   a handling plate for handling the item of mail upon receipt from the acceptance compartment;
   a controller for moving the handling plate along a displacement path between the acceptance compartment and a plurality of mail handling positions;
   a measuring system for measuring physical properties of the item of mail and forwarding physical properties data to the controller;
   an electronic camera connected to the controller and positioned above the displacement path at a mail handling position;
   a display positioned near the acceptance compartment for displaying at least a surface image of the item of mail recorded by the electronic camera;

an applicator connected to the controller for applying a marking to the item of mail positioned on the controller;

a light source for illuminating the handling plate positioned underneath the handling plate;

a Fresnel lens positioned above the handling plate; and an electro-optical measuring device for measuring a length and width of the item of mail, wherein the Fresnel lens is positioned at a focal point of the electro-optical measuring device and dimensions of the Fresnel lens are greater than a vertical projection of a largest item of mail to be measured.

14. A device as claimed in claim 13, wherein the Fresnel lens is pivotable between a position covering the handling plate and a position exposing the handling plate.

15. A device as claimed in claim 13, wherein the handling plate has a light-diffusing surface.

16. A device as claimed in claim 15, wherein the handling plate is opaque.

17. A device as claimed in claim 15, wherein the light source is positioned laterally above the handling plate.

18. A device for automatically accepting and marking an item of mail, comprising:

an acceptance compartment for accepting the item of mail;

a handling plate for handling the item of mail upon receipt from the acceptance compartment;

a controller for moving the handling plate along a displacement path between the acceptance compartment and a plurality of mail handling positions;

a measuring system for measuring physical properties of the item of mail and forwarding physical properties data to the controller;

an electronic camera connected to the controller and positioned above the displacement path at a mail handling position;

a display positioned near the acceptance compartment for displaying at least a surface image of the item of mail recorded by the electronic camera;

an applicator connected to the controller for applying a marking to the item of mail positioned on the controller; and a paying-in device, wherein a charge is determined in the controller based on the physical properties data and is indicated on the display, and wherein the paying-in device enables the applicator to apply the marking to the item of mail upon receipt of the charge.

19. A device as claimed in claim 18, wherein the applicator includes a head for picking up a label to which the marking is applied, the head being positionable over both a label dispenser and the handling plate and further being rotatable about a vertical axis as well as vertically displaceable.

20. A device as claimed in claim 19, wherein the head is a flexible pad having at least one channel susceptible to reduced air pressure under control of the controller.

21. A device as claimed in claim 19, further comprising:

at least one container positioned beneath the displacement path for optionally receiving the item of mail from the handling plate.

22. A device as claimed in claim 19, wherein the electronic camera is a line camera having an angular aperture corresponding to a width of the handling plate.

23. A device as claimed in claim 19, further comprising:

a printer connected to the controller for outputting a record of the charge.

24. A process for automatically accepting and marking an item of mail, comprising the steps of:

depositing the item of mail on a handling plate;

using at least one measuring device to determine weight and/or dimension data of the item of mail;

determining a marking to be applied to the item of mail based on the weight and/or dimension data;

recording a surface image of the item of mail using an electronic camera;

displaying both the surface image and the marking on a screen; and applying the marking to the item of mail via key pad actuation.

25. A process as claimed in claim 24, further comprising the steps of:

displaying a place of intended application of the marking on the item of mail in the display; and acknowledging the place of intended application by actuating a first key of an input device.

26. A process as claimed in claim 24, further comprising the step of:

determining a length and width of the item of mail using the electronic camera.

27. A process as claimed in claim 24, further comprising the steps of:

transilluminating the handling plate with a light source positioned therebeneath; and capturing an outline of the item of mail using the electronic camera.

28. A process as claimed in claim 24, further comprising the step of:

receiving a charge prior to applying the marking to the item of mail.

29. A process as claimed in claim 24, further comprising the step of:

depicting the surface image of the item of mail on the display such that, regardless of an actual alignment of the item of mail on the handling plate, at least one edge of the item of mail is approximately parallel to an edge of the display.

30. A process as claimed in claim 24, further comprising the steps of:

providing an acceptance compartment having a closure device;

opening the closure device;

inserting the item of mail through the closure device onto the handling plate;

closing the closure device; and reopening the closure device if no marking is applied to the item of mail.

31. A process as claimed in claim 30, further comprising the steps of:

moving the handling plate into an interior area of the device after closing of the closure device;

sensing if the item of mail has moved a predetermined distance;

returning the handling plate to the acceptance compartment if the handling device is not so sensed; and opening the closure device.

32. A process as claimed in claim 24, further comprising the step of:

moving the handling plate onto a balance to determine a weight of the item of mail.

33. A process as claimed in claim 32, further comprising the step of:

moving the handling plate under the electronic camera after a weight-measuring operation.

34. A process as claimed in claim 24, further comprising the step of:

indicating a position intended for application of the marking in the surface image of the item of mail.

35. A process as claimed in claim 34, further comprising the step of:

changing the position of the marking in the surface image of the item of mail by actuating an input key of the input device.

36. A process for automatically accepting and marking an item of mail, comprising the steps of:

depositing the item of mail on a handling plate;

using at least one measuring device to determine weight and/or dimension data of the item of mail;

determining a marking to be applied to the item of mail based on the weight and/or dimension data;

recording a surface image of the item of mail using an electronic camera;

displaying both the surface image and the marking on a screen;

applying the marking to the item of mail via key pad actuation;

transferring the item of mail onto a turning plate wherein the turning plate temporarily takes over the function of the handling plate; and using the electronic camera to again sense the position, shape and image-related properties of the item of mail.

37. A process as claimed in claim 36, further comprising the steps of:

pivoting the turning plate into a position covering the handling plate;

pivoting, simultaneously, both the turning plate and the handling plate through approximately 180° about an axis near one edge of the handling plate wherein the turning plate comes to lie beneath the item of mail; and pivoting the handling plate out of its position covering the turning plate.

38. A process as claimed in claim 37, further comprising the steps of:

moving the handling plate into a horizontal position; and pivoting the turning plate about the axis wherein the item of mail may again slide onto the handling plate.

39. A process for automatically accepting and marking an item of mail, comprising the steps of:

depositing the item of mail on a handling plate;

using at least one measuring device to determine weight and/or dimension data of the item of mail;

determining a marking to be applied to the item of mail based on the weight and/or dimension data;

recording a surface image of the item of mail using an electronic camera;

displaying both the surface image and the marking on a screen;

applying the marking to the item of mail via key pad actuation;

providing an applicator for applying the marking which includes a head piece;

rotating the head piece about a vertical axis so that one edge of the marking is approximately parallel to one edge of the item of mail;

moving the applicator along a first horizontal axis to a first calculated position;

moving the handling plate along a second horizontal axis which is orthogonal to the first axis to a second calculated position; and lowering the head piece in a direction of the item of mail to apply the marking.

40. A process as claimed in claim 39, further comprising the step of:

permanently storing the surface image of the item of mail after applying the marking.

41. A process as claimed in claim 39, further comprising the step of:

printing a copy of the surface image onto a record wherein the record is made available to a user of the process.

42. A process as claimed in claim 39, further comprising the steps of:

tipping the handling plate after applying the marking; and sliding the item of mail into a container.

43. A process as claimed in claim 39, further comprising the steps of:

picking up a self-adhesive label which serves as the marking with the head piece; and transporting the label with a flexible pad having one or more channels subjected to reduced air pressure.

44. A process as claimed in claim 43, further comprising the step of:

providing the label by a label printer.

45. A process as claimed in claim 39, further comprising the step of:

creating and storing a second surface image having higher resolution than the first surface image.

46. A process as claimed in claim 45, wherein a second high-resolution line camera is used to create the second surface image by moving the handling plate in relation to the line camera.

47. A process as claimed in claim 39, further comprising the steps of:

subjecting the surface image of the item of mail to a text recognition process;

providing a result of the text recognition process to a user of the process; and correcting, if necessary, the surface image of the item of mail by the user of the process.

48. A process as claimed in claim 47, further comprising the steps of:

obtaining a zip code in response to the text recognition process;

printing the zip code onto the item of mail;

placing the zip code, if desired, in the marking; and using the zip code, if desired, for controlling diverters in a continued conveyance of the item of mail.

\* \* \* \* \*